United States Patent
Peana et al.

(10) Patent No.: US 12,073,544 B2
(45) Date of Patent: Aug. 27, 2024

(54) METHOD AND SYSTEM OF IDENTIFYING AND CORRECTING ENVIRONMENTAL ILLUMINATION LIGHT SOURCES REFLECTING ONTO DISPLAY SURFACE

(71) Applicant: Dell Products L.P., Round Rock, TX (US)

(72) Inventors: Stefan Peana, Austin, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 405 days.

(21) Appl. No.: 17/561,141

(22) Filed: Dec. 23, 2021

(65) Prior Publication Data

US 2023/0206409 A1 Jun. 29, 2023

(51) Int. Cl.
*G06T 5/92* (2024.01)
*G09G 5/02* (2006.01)

(52) U.S. Cl.
CPC .............. *G06T 5/92* (2024.01); *G09G 5/02* (2013.01); *G09G 2320/062* (2013.01); *G09G 2320/0626* (2013.01); *G09G 2360/144* (2013.01)

(58) Field of Classification Search
CPC .. G06F 3/147; G06T 5/92; G06T 5/94; G09G 2320/062; G09G 2320/0626; G09G 2360/144; G09G 5/02; H05B 47/105
See application file for complete search history.

(56) References Cited

U.S. PATENT DOCUMENTS

| | | | |
|---|---|---|---|
| 2015/0262024 A1* | 9/2015 | Braithwaite | G06V 10/141 382/118 |
| 2015/0374210 A1* | 12/2015 | Durr | A61B 1/000096 600/111 |
| 2018/0020201 A1* | 1/2018 | Motta | G06F 3/012 |
| 2019/0129674 A1* | 5/2019 | Kuwada | G06T 15/04 |
| 2019/0191153 A1* | 6/2019 | Speigle | G09G 5/10 |
| 2020/0105171 A1* | 4/2020 | Greenebaum | G06T 5/80 |
| 2020/0342629 A1* | 10/2020 | Kuwada | G06T 7/44 |
| 2021/0097776 A1* | 4/2021 | Faulkner | G06V 40/28 |
| 2022/0091723 A1* | 3/2022 | Faulkner | G06F 3/017 |

OTHER PUBLICATIONS

Salma Jiddi,"Detecting Specular Reflections and Cast Shadows to Estimate Reflectance and Illumination of Dynamic Indoor Scenes," Feb. 28, 2020, IEEE Transactions on Visualization and Computer Graphics, vol. 28, No. 2, Feb. 2022,pp. 1249-1257.*

(Continued)

*Primary Examiner* — Omar S Ismail
(74) *Attorney, Agent, or Firm* — Terrile, Cannatti & Chambers, LLP; Emmanuel A. Rivera

(57) ABSTRACT

Described herein are methods and a system to correct environmental light reflecting onto a surface of a display. An image is captured by camera which is processed as an image digital map. Light sources on the image digital map are determined based on correlated camera pixel map and display map. Light sources are on the image digital map are augmented by one or more ambient light sensors (ALS) placed on the periphery of the display. Image correction is performed based on the light sources of the image digital map.

17 Claims, 7 Drawing Sheets

(56) References Cited

OTHER PUBLICATIONS

Michael E. Becker, "Display reflectance: Basics, measurement, and rating," Jun. 18, 2012, Journal of the SID 14/11, 2006, pp. 1003-1015.*
Shoaib R. Soomro, "Light-efficient augmented reality 3D display using highly transparent retro-reflective screen," Jul. 24, 2017, vol. 56, No. 22, Aug. 1, 2017, Applied Optics, pp. 6108-6111.*
Tian Zhou, "Improved system calibration for specular surface measurement by using reflections from a plane mirror," Aug. 29, 2016, vol. 55, No. 25, Sep. 1, 2016, Applied Optics, pp. 7018-7026.*

* cited by examiner

METHOD AND SYSTEM OF IDENTIFYING AND CORRECTING ENVIRONMENTAL ILLUMINATION LIGHT SOURCES REFLECTING ONTO DISPLAY SURFACE

BACKGROUND OF THE INVENTION

Field of the Invention

The present invention relates to displays implemented by information handling systems. More specifically, embodiments of the invention provide identifying and correcting environmental light reflecting onto a display surface of a display device.

Description of the Related Art

As the value and use of information continues to increase, individuals and businesses seek additional ways to process and store information. One option available to users is information handling systems. Information handling systems include personal computers (PC), server computers, such as desktops. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Video displays or displays can be implemented with information handling systems. For example, information handling systems configured as laptop computers can include an integrated display. Image quality of displays can be considered as a weighted combination of visually significant attributes of objects in an image. The viewing of an image on a display, even with perfect image quality, can be disrupted/affected by environmental (i.e., external) light sources reflected on the surface of the display screen. Such environmental light sources include specular light and reflective light. It would be desirable to identify the shape and location of such environmental or specular and reflected light sources and to diminish or reduce their impact relative to image quality presented on a display. The challenge is to reduce the effect of such environmental light sources, and provide clear image quality to users. Solutions should be relatively low cost to implement and easily adaptable to existing information handling systems.

SUMMARY OF THE INVENTION

A computer-implementable method, system and computer-readable storage medium for correcting environmental light reflecting onto a surface of a display comprising capturing an image by a camera on the information handling system; processing the captured image as an image digital map; determining the light sources of image digital map based on correlated camera pixel map and display pixel map; augmenting light sources on the image digital map based on data from one or more ambient light sensors (ALS) placed on the periphery of the display; and performing an image correction based on the light sources of the image digital map.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
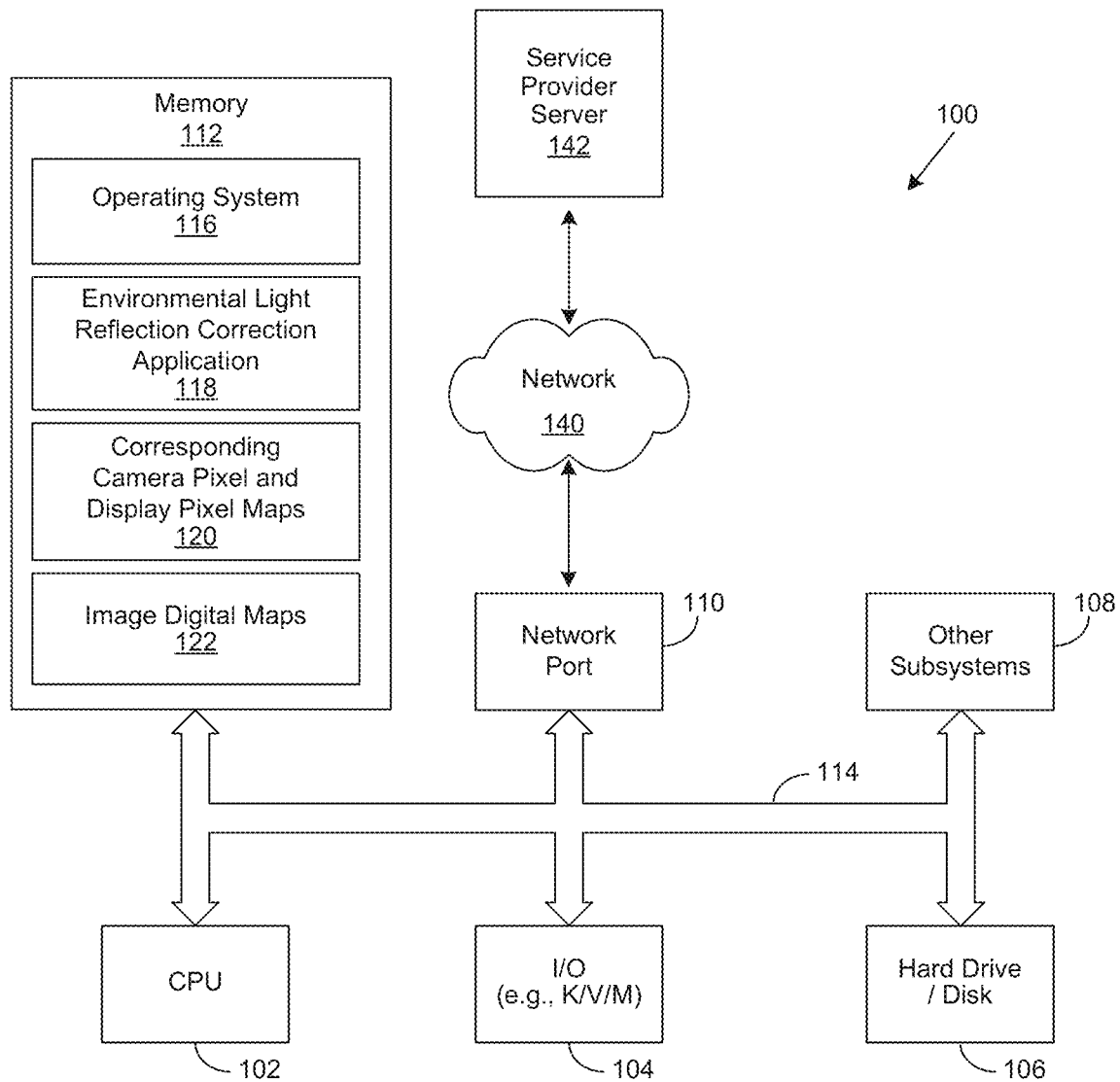
FIG. 1 is a general illustration of components of an information handling system as implemented in the present invention.

Various implementations provide for a mounting jig for a reference screen that reflects an image from a display of an information handling system, such as a laptop. The image is used to correlate pixels or groups of pixels of a pixel map of a camera of the laptop to pixels or groups of pixels of a pixel map of the display. The image can have cross marks and other reference markers. The camera captures the image reflected on the reference screen, and a one-to-one mapping is performed for pixels or groups of pixels of the camera pixel map and display pixel map. This procedure can take place during configuration of the laptop prior to being released to a user. Therefore, when the camera takes an image, location of sources of light on the display by correlating the camera pixel map and the display pixel map.

Implementations during use of the laptop and display, include the camera capturing environmental illumination light sources of an image, decomposing the captured image to separate diffuse light sources from specular illumination light sources, and map light source locations to display pixel arrangement. Image correction can be applied image to convert image brightness values to digital value for display execution.

Implementations include the use of one or more ambient light sensors (ALS) placed on the periphery of the display. The ALS sensors can augment images outside the camera field of view (FOV), which can be greater than 78 degrees, at an incident angle outside FOV of user/viewer. A histogram analysis can be used to calculate diffuse display surface reflection, across horizonal and vertical display surface. Therefore, the camera and ALS sensor(s) can work together to identify both diffuse and specular light sources or independently should display system be stationary. Telemetry from system adjustments or viewer presence can be leveraged to optimize reflection processing or to manage power consumption.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

FIG. 1 is a generalized illustration of an information handling system 100 that can be used to implement the system and method of the present invention. The information handing system 100 can be a host to the peripheral devices described herein.

The information handling system 100 includes a processor (e.g., central processor unit or "CPU") 102, input/output (I/O) devices 104, such as a microphone, a keyboard, a video display, a mouse, and associated controllers (e.g., K/V/M), a hard drive or disk storage 106, and various other subsystems 108. In various implementations, as further described herein, the video display of I/O devices 104 is calibrated and adjusted for image quality to address environmental light sources, such specular light and reflective light sources.

In various embodiments, the information handling system 100 also includes network port 110 operable to connect to a network 140, where network 140 can include one or more wired and wireless networks, including the Internet. Network 140 is likewise accessible by a service provider server 142. The information handling system 100 likewise includes system memory 112, which is interconnected to the foregoing via one or more buses 114. System memory 112 can be implemented as hardware, firmware, software, or a combination of such. System memory 112 further includes an operating system (OS) 116. Embodiments provide for the system memory 112 to include one or more applications, such as environmental light reflection correction application 118 further described herein. System memory 112 can also include corresponding camera pixel and display pixel maps 120 further described herein. In addition, implementations provide for the system memory to include image digital maps 122 as further described herein.

Figure 2:
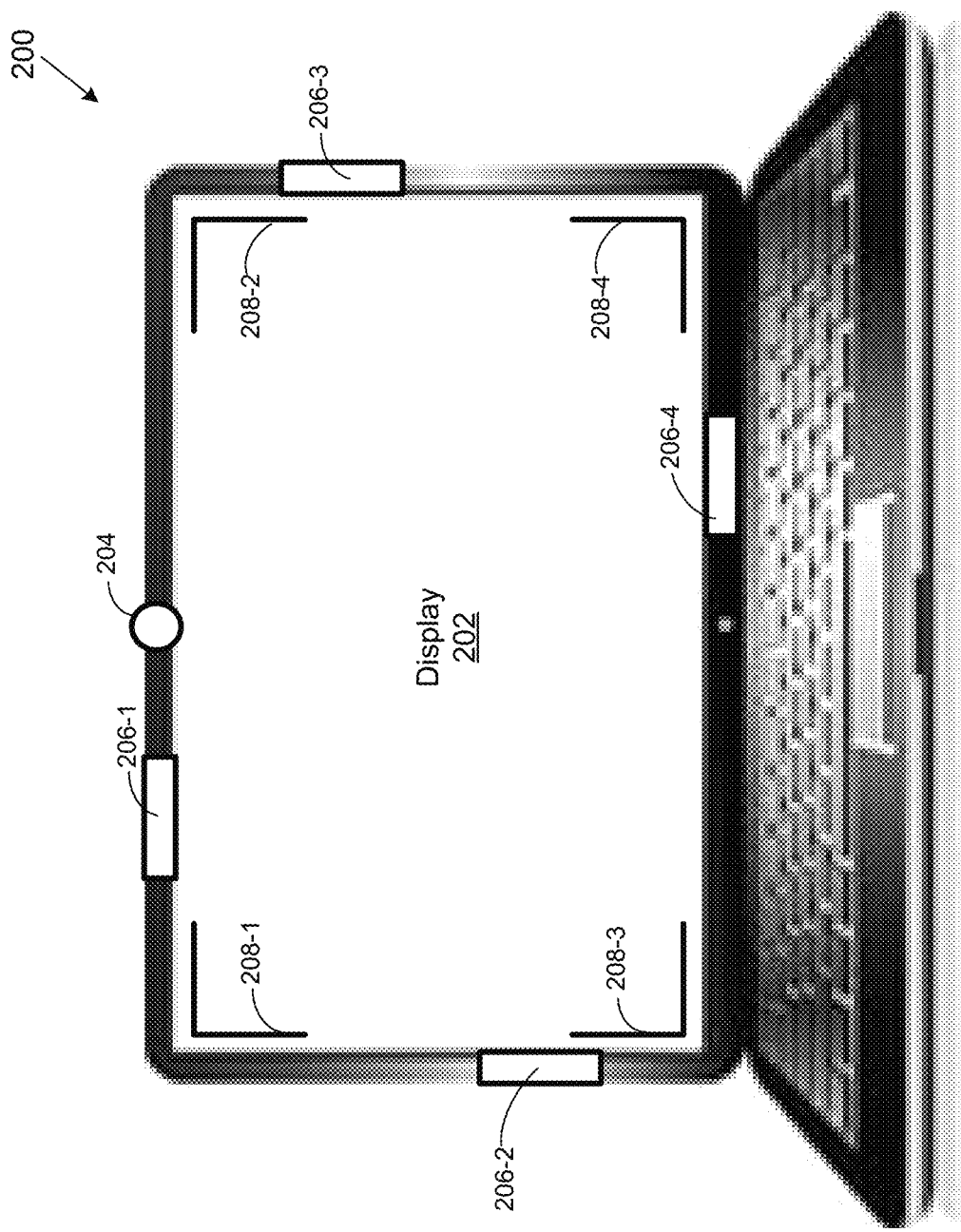
FIG. 2 illustrates a laptop computer with a display as implemented in the present invention.

FIG. 2 shows a system implementing a laptop computer 200 with a display 202 as implemented in the present invention. Laptop computer 200 can be implemented as an information handling system 100 as described in FIG. 1.

Various implementations provide for an integrated camera 204 as part of the laptop computer 200. The camera 204 can be an RGB camera used for various applications by the laptop computer, such as video conferencing, video and still image recording, etc. In the methods described herein, the camera 204 is used for calibration and correlation of corresponding camera pixel and display pixel maps 120. Camera 204 further provides for taking images that are converted to image digital maps 122.

Implementations can also include one or more ambient light sensors or ALS sensors 206-1, 206-2, 206-3 and 206-4. The ALS sensors 206 are photodetectors that sense the amount of ambient light that is present. In certain implementations, the ALS sensors 206 can appropriately dim the display 202 to match the ambient light. Such implementations are used to adjust for user viewing in a dark room or in a bright environment such as outdoor use. In the methods described herein, the ALS sensors 206 are placed along the edges of the display 202 and read environmental diffuse illumination. In various implementations, ALS sensor 206-1 is an ALS edge sensor with an up-view aperture, ALS sensor 206-2 is an ALS edge sensor with a side-view aperture, ALS sensor 206-3 is an ALS edge sensor with a side-view aperture, and ALS sensor 206-4 is an ALS edge sensor with a down-view aperture.

Implementations provide for the camera 204 and ALS sensors 206 to operate together to identify both diffuse and specular light sources. The camera 204 and ALS sensors 206 can also operate independently when the display 202 is stationary. Implementation can further provide for system (i.e., laptop computer 200) adjustments from telemetry or from user/viewer presence to leverage optimization of reflection processing and/or managing power consumption.

In certain implementations, cross marks 208-1, 208-2, 208-3, and 208-4 are presented in the corners of the display 202. The corner cross marks 208 and other markers can be presented/turned on to determine relative locations of the ALS sensors 206.

Figure 3:
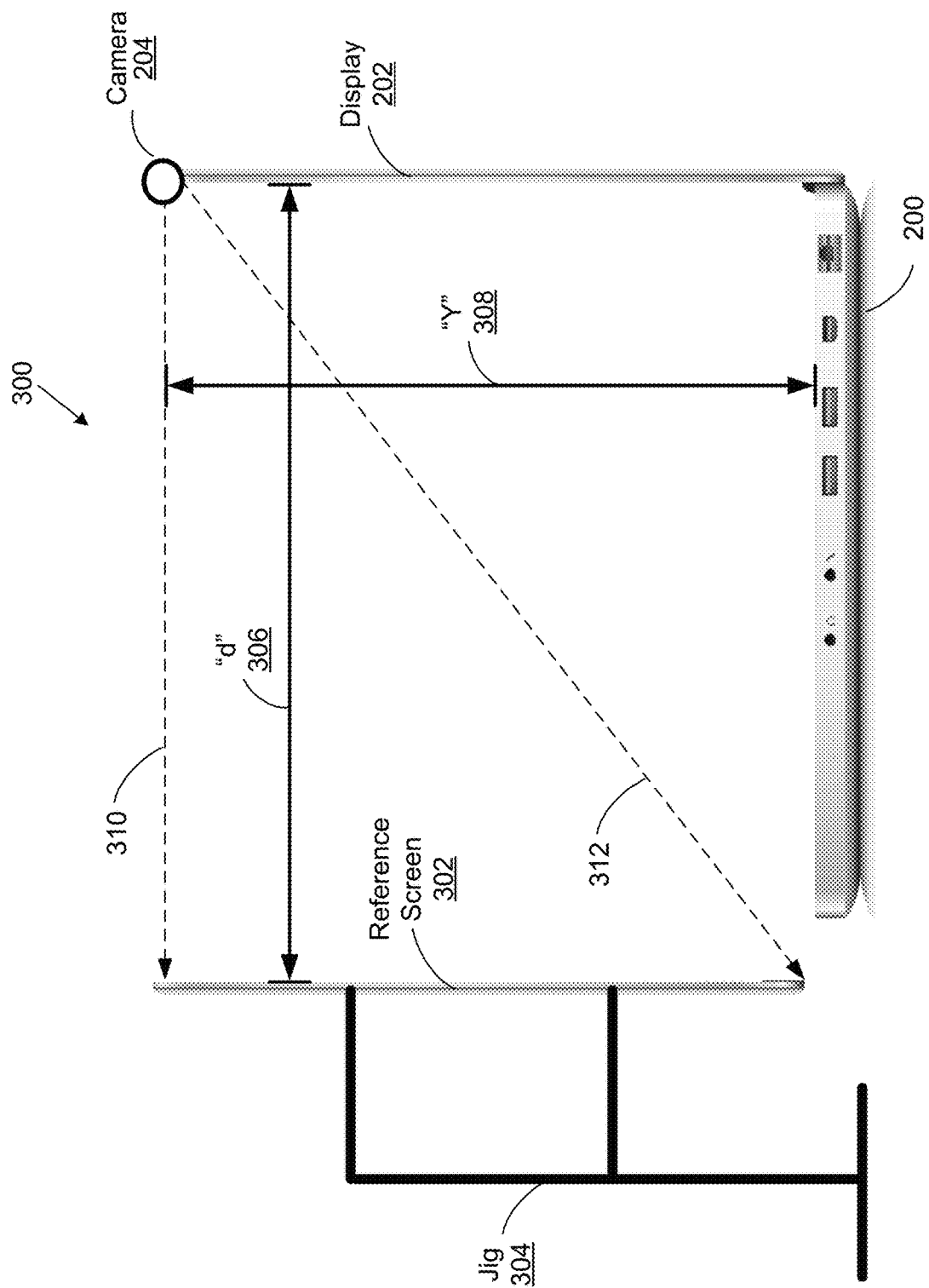
FIG. 3 illustrates a laptop computer with a display and reference screen for calibration of camera pixel map and matching display pixel map as implemented in the present invention.

FIG. 3 shows a configuration 300 with laptop computer 200 with display 202 and a reference screen 302 for calibration of camera pixel map and matching display pixel map. Implementations provide for the configuration 300 to be used in assembly and calibration of the laptop computer 200 prior to delivery to a consumer/user.

A mounting jig 304 is used to keep reference screen 302 stationary relative to the computer 200 and particular in reference to the display 202. Implementations provide for the reference screen 302 to be reflective of images shown at display 202.

Configuration 300 provides aligning a distance and a height between the camera 204 and reference screen 302. In particular, a preset distance "d" 306 and preset height "Y" 308 can be implemented. Furthermore, implementations provide for consideration as to the width or "X" (not shown) of the display 202.

Camera 204 is aligned with reference screen 302. Lines 310 and 312 align with the corner cross marks 208 that are presented on display 202 and reflected on reference screen 302. Camera 204 captures an image that is reflected on the reference screen 302. Calculations can be performed using "d" 306, Y" 308, and "X" to be determine scaled values of the captured image. The captured image includes the corner cross marks 208 which are used as references in determining a one-to-one pixel or group of pixels matching of a camera pixel map of the camera 204 and a display pixel map of the display 202.

Calibrating a camera pixel map and matching a display pixel map the following is performed. The reference screen 302 is placed in mounting jig 304 and location is determined relative to display 202. Distance is aligned as to camera 204 and pre-set height and distance, "Y" 308, "d" 306, and "X". An image with the corner cross marks 208, as well as any other markers, is presented/shown on the display 202. The image is reflected on the reference screen 302 and captured by the camera 204. The captured digital image is processed. The processing can be performed by a raster scan of the pixels of the captured image. Camera 204 to display 202 one-to-one pixel alignment is performed.

Figure 4:
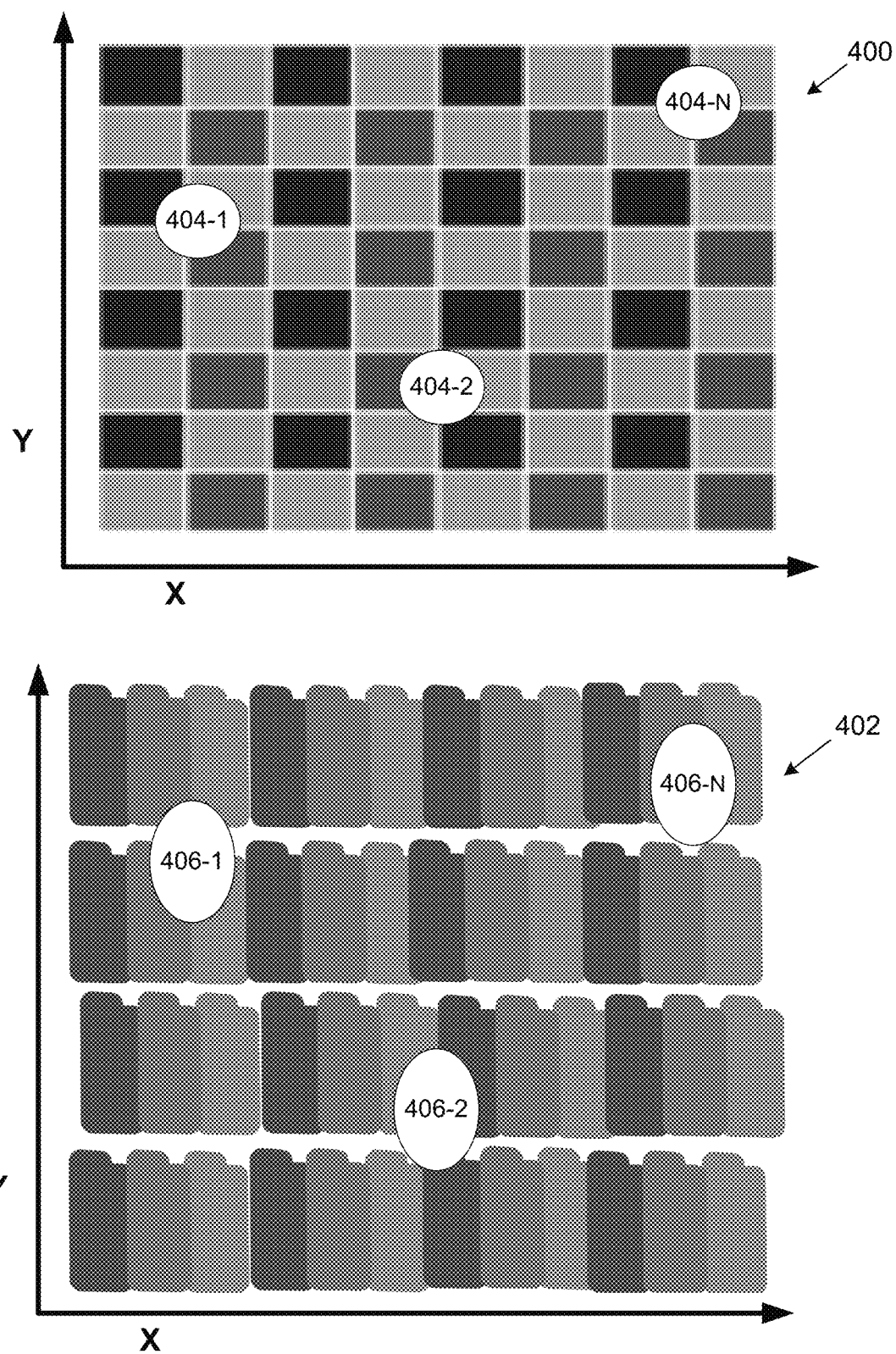
FIG. 4 illustrates a camera pixel map and a corresponding display pixel map as implemented in the present invention.

FIG. 4 shows a camera pixel map 400 and a corresponding display pixel map 402 as implemented in the present invention. In various implementations, the camera pixel map 400 is predefined or determined for the camera 204. Pixels of the camera pixel map 400 may be arranged in a particular format. An example of pixel arrangement can be Bayer pixel arrangement. Likewise, implementations provide for the display pixel map 402 to be predefined or determined for the display 204. Pixels of the display pixel map 402 may be arranged in a particular format. An example of pixel arrangement can be an RGB pixel arrangement.

Pixels or groups of pixels of the camera pixel map 400 are aligned or correspond to pixels or groups of pixels of the display pixel map 402, based on the calibration described above. "X, Y" location of pixels or groups of pixels of camera pixel map 400 correspond the "X, Y" location of pixels or groups of pixels of display pixel map 402. All pixels and their locations of camera pixel map 400 correspond to all pixels and their locations of display pixel map 402. For example, pixels or groups of pixels 404-1 of the camera pixel map 400 correspond to pixels or groups pixels 406-1 of the display pixel map 402. Pixels or groups of pixels 404-2 of the camera pixel map 400 correspond to pixels or groups pixels 406-2 of the display pixel map 402. Pixels or groups of pixels 404-N of the camera pixel map 400 correspond to pixels or groups pixels 406-N of the display pixel map 402.

As described above in FIG. 3, various implementations provide for a calibration or determination of corresponding "X, Y" locations of pixels or groups of pixels 404 of camera pixel map 400 to "X, Y" locations of pixels or groups of pixels 406 of display pixel map 402. For example, in an implementation as described in FIG. 3, camera 204 captures an image that is reflected on the reference screen. Calculations can be performed using "d" 306, "Y" 308, and "X" to determine scaled values of the captured image.

Implementations provide for the camera pixel map 400 and display pixel map 402 to be stored and referenced in corresponding camera pixel and display pixel maps 120 described in FIG. 1.

Figure 5:
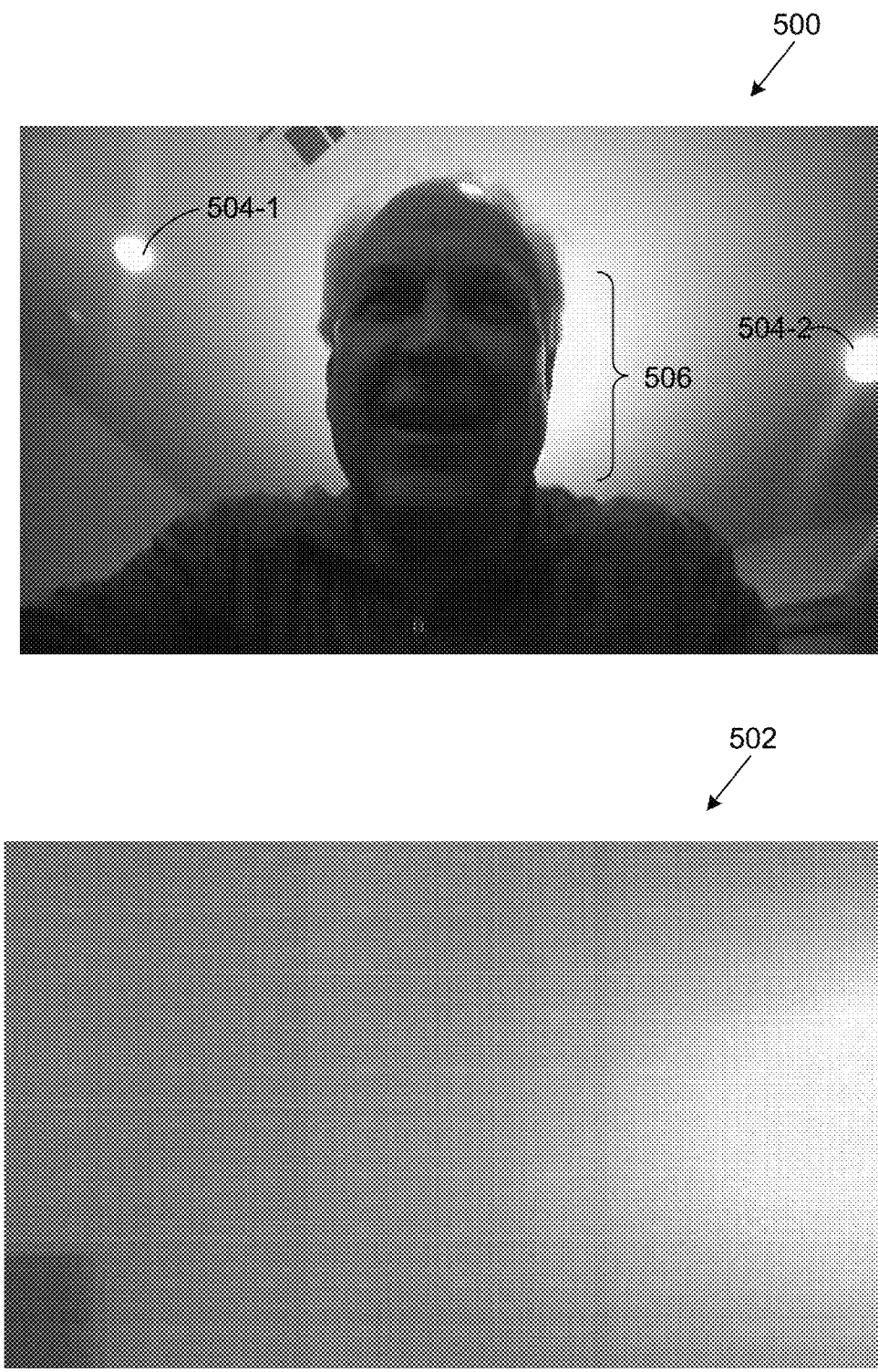
FIG. 5 illustrates a captured image and image digital map 502 as implemented in the present invention.

FIG. 5 shows a captured image 500 and image digital map 502. Implementations provide for the digital image 500 to be captured by camera 204 during the use of laptop computer 200 (i.e., an information handling system). Digital images, such as digital image 500 can include specular light and reflective light sources. For example, specular light sources 504-1 and 504-2, and reflective light source 506. As discussed, specular and reflective light sources, such as 504-1, 504-2, and 506 can diminish image quality. Such specular and reflective light sources are identified and adjusted for (i.e., reduced) to provide a better image quality.

Implementations provide for the image digital map 502 to be created from captured image 500 as further discussed herein. The image digital map 502 includes specular light sources 504-1 and 504-2, and reflective light source 506. The image digital map 502 shows illumination magnitudes. Implementations further provide for ALS sensors, such as ALS sensors 206 to account for light sources outside the FOV of camera 204 in the creating of image digital map 502. The image digital map 502 can be stored in image digital maps 102. As further discussed herein, the image digital map 502 can be used to correct proceeding captured images.

In operation, for example, implementations provide for the camera 204 to capture the image 500. The image 500 may be converted to image digital map 502 that includes specular light sources 504-1 and 504-2, and reflective light source 506 shows illumination magnitudes. Using the corresponding camera pixel and display pixel maps 120, light source locations can be determined. As further described herein diffuse and specular correlation algorithms, which can be implemented by the environmental light reflection correction application 118, can be used to reduce or eliminate the identified specular and reflective light sources, such as 504-1, 504-2, and 506. In certain implementations, the ALS sensors 206 described in FIG. 2 can be used to augment images that are outside the field of view of the camera 204, which may be at an incident angle outside a user's or viewer's field of view.

Figure 6:
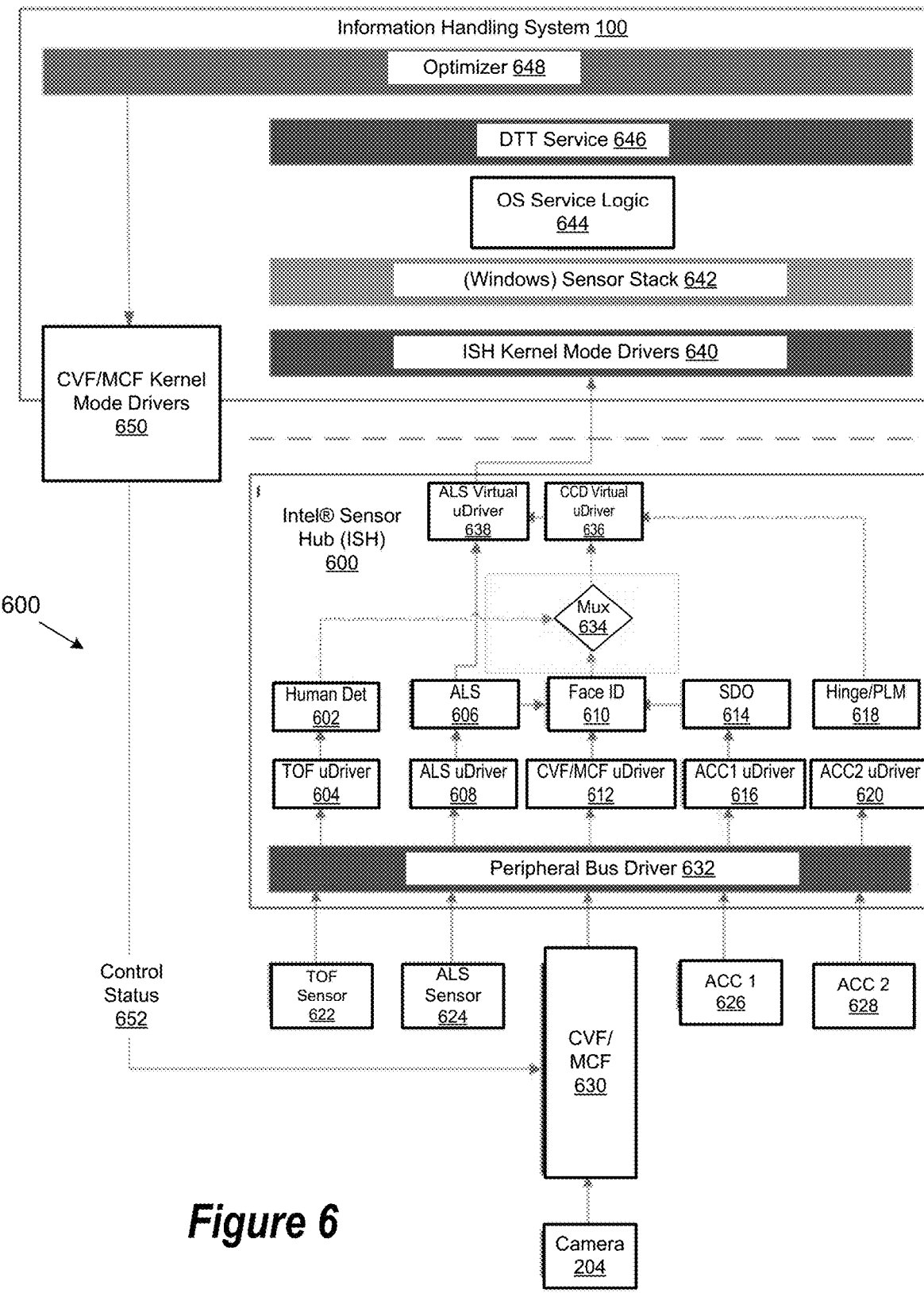
FIG. 6 illustrates a system architecture for identifying and correcting environmental light reflecting onto a display surface of a display.

FIG. 6 shows a system architecture for identifying and correcting environmental light reflecting onto a display surface of a display. In various implementations, system architecture 600 is based on the use of an Intel® Sensor Hub (ISH) 600. The ISH 600 can be configured to receive data, and particularly image data and perform different operations, such as compensation algorithms. Examples of operations performed by the ISH 600 shown are human detection 602 supported by a time of flight (TOF) micro driver 606, ALS 606 supported by an ALS micro driver 608, face ID 610 supported by a CVF/MCF micro driver 612, SDO 614 supported by an ACC1 micro driver 616, and hinge/PLM 618 supported by an ACC1 micro driver 620.

Implementations provide for external data to be received for example from sensors and/or components such as TOF sensor 622, ALS sensor 624, ACC1 sensor 626 and ACC2 sensor 628. The sensors 622, 624, 626, and 628 can be provide reflective light information that may appear on a display (i.e., display 202). A CVF/MCF component 630 receives image data from camera 204. Image data includes captured image 500 described above.

Data from the respective sensors/components are sent to a peripheral bus driver 632 and passed up to the described micro drivers and operations. A decision box or multiplexor or mux 634 determines the outputs to pass along for further processing.

In various implementations, mux 634 provides an input to a CCD (camera) virtual micro driver 636 which performs specular reflection correction. Implementations provide for the virtual micro driver 636 to provide an input to an ALS virtual micro driver 638 which accounts for field of view (FOV) correction. Image correction data is provided from the ALS virtual micro driver 638, where image correction data includes the identified specular illumination light sources.

In this example, the ALS virtual micro driver 638 passes on input to ISH kernel mode drivers 640. A (Windows) sensor stack 642 receives data from the ISH kernel mode drivers 640. Implementations provide for an operating system (OS) service logic component to receive the image data and create an image digital map, such as image digital map 502. The image digital map includes or identifies specular illumination light sources, and can be used for image correction, correcting environmental light reflecting onto a display surface as described herein.

Implementations provide for the sensor stack 642 to pass the data and the image digital map to DTT service 646 and optimizer 648. Implementations provide for the optimizer 648 to be configured to perform correction for specular light and reflective light sources. The data/information from the image digital map can be used for correction of proceeding images that are captured. Implementations provide for the data/information to be passed to CVF/MCF kernel mode drivers 650. Control status 652 is provided to the CVF/MCF component 630 to correct proceeding captured images from camera 204. Because the processing of the image digital map can be resource extensive, the processing may be performed over a period of time or when a user initiates the process. Implementations can provide for the OS service logic 644 to provide a user mode.

Figure 7:
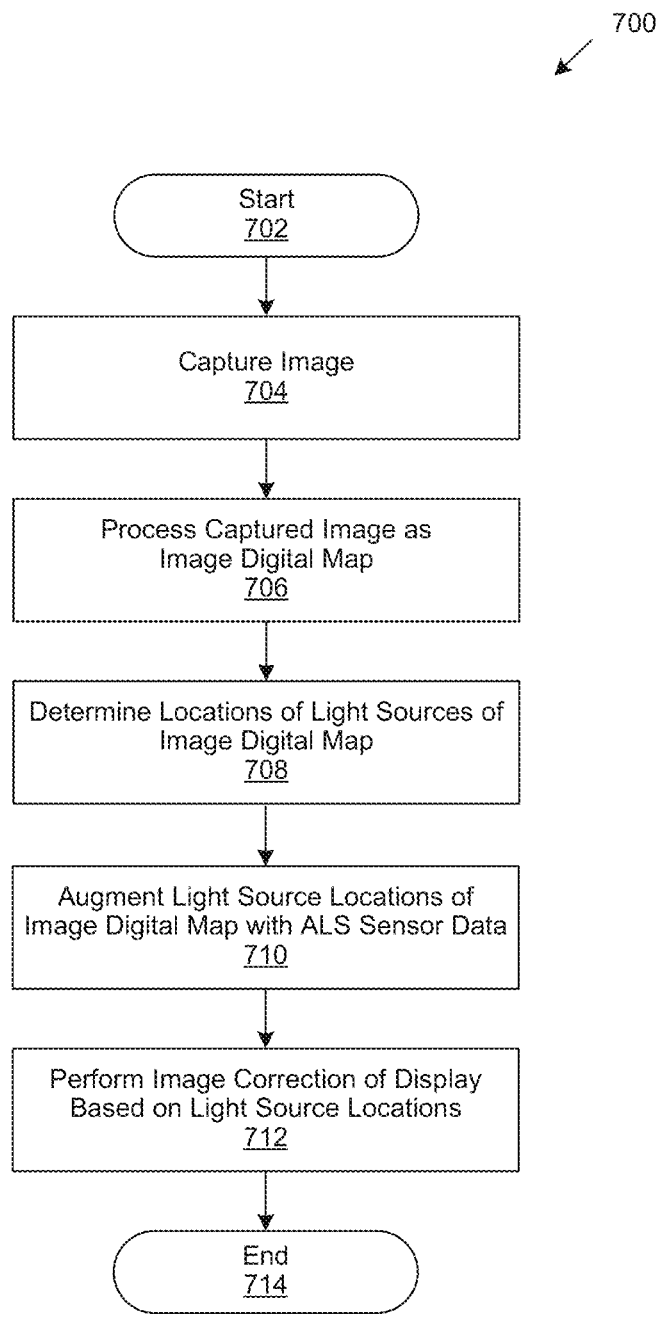
FIG. 7 is a generalized flowchart for correcting environmental light reflecting onto a display surface of a display device.

FIG. 7 shows a generalized flowchart for correcting environmental light reflecting onto a display surface of a display device. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 702, the process 700 starts. At step 704, an image is captured by a camera of an information handling system, such as camera 204 of laptop 200. At step 706, the captured image is processed as an image digital map, as described in FIG. 6 above. The image digital map can be stored in image digital maps 122 as described in FIG. 1.

At step 708, locations of light sources of the image digital map are determined. As described above, correlation is initially performed for a one-to-one matching of pixels or groups of pixels of a camera pixel map and a display pixel map. The correlated camera pixel map and display pixel maps can be stored in corresponding camera pixel and display pixel maps 120 as described in FIG. 1. Using the correlated camera pixel map and display pixel maps, when the camera 204 captures and image, pixel location of light sources can be determined for the display 202.

At step 710, augmentation is performed using ambient light sensors (ALS), such as ALS sensors 206 described in FIG. 2. The ALS sensors are used for light sources that are outside the field of view (FOV) of the camera 204. The augmented ALS sensor data can be added to the image digital map as described in FIG. 6.

At 712, image correction for the display 202 is performed based on the data in the image digital map. Proceeding captured images can be adjusted based on the data in the image digital map. At step 714, the process 700 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for correcting environmental light reflecting onto a surface of a display of an information handling system comprising:
    capturing an image by a camera on the information handling system;
    processing the captured image as an image digital map;
    determining the light sources of image digital map based on correlated camera pixel map and display pixel map, wherein the camera pixel map and display pixel map are correlated by performing a one-to-one mapping of pixels or groups of pixels of the camera pixel map to the display pixel map;
    augmenting light sources on the image digital map based on data from one or more ambient light sensors (ALS) placed on the periphery of the display; and
    performing an image correction based on the light sources of the image digital map.

2. The computer-implementable method of claim 1, wherein the processing is performed through a sensor hub that includes a virtual micro driver that performs specular reflection correction.

3. The computer-implementable method of claim 1, wherein the processing is performed based on period of time or user initiated.

4. The computer-implementable method of claim 1, wherein the augmenting of light sources by the ALS sensors is performed through a sensor hub that includes virtual micro driver that accounts for field of view correction outside of the camera.

5. The computer-implementable method of claim 1, wherein the performing image correction is performed by providing control status to adjust the captured image.

6. The computer-implementable method of claim 1 further comprising using control status from the image digital map for correction of proceeding images that are captured.

7. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations for correcting environmental light reflecting onto a surface of a display and comprising instructions executable by the processor and configured for:
    capturing an image by a camera on the information handling system;
    processing the captured image as an image digital map;
    determining the light sources of image digital map based on correlated camera pixel map and display pixel map, wherein the camera pixel map and display pixel map are correlated by performing a one-to-one mapping of pixels or groups of pixels of the camera pixel map to the display pixel map;
    augmenting light sources on the image digital map based on data from one or more ambient light sensors (ALS) placed on the periphery of the display; and
    performing an image correction based on the light sources of the image digital map.

8. The system of claim 7, wherein the processing is performed through a sensor hub that includes a virtual micro driver that performs specular reflection correction.

9. The system of claim 7, wherein the processing is performed based on period of time or user initiated.

10. The system of claim 7, wherein the augmenting of light sources by the ALS sensors is performed through a sensor hub that includes virtual micro driver that accounts for field of view correction outside of the camera.

11. The system of claim 7, wherein the performing image correction is performed by providing control status to adjust the captured image.

12. The system of claim 7 further comprising using control status from the image digital map for correction of proceeding images that are captured.

13. A non-transitory, computer-readable storage medium embodying computer program code, the computer program code comprising computer executable instructions configured for:
    capturing an image by a camera on the information handling system;
    processing the captured image as an image digital map;
    determining the light sources of image digital map based on correlated camera pixel map and display pixel map, wherein the camera pixel map and display pixel map are correlated by performing a one-to-one mapping of pixels or groups of pixels of the camera pixel map to the display pixel map;
    augmenting light sources on the image digital map based on data from one or more ambient light sensors (ALS) placed on the periphery of the display; and
    performing an image correction based on the light sources of the image digital map.

14. The non-transitory, computer-readable storage medium of claim 13, wherein the processing is performed through a sensor hub that includes a virtual micro driver that performs specular reflection correction.

15. The non-transitory, computer-readable storage medium of claim 13, wherein the processing is performed based on period of time or user initiated.

16. The non-transitory, computer-readable storage medium of claim 13, wherein the augmenting of light sources by the ALS sensors is performed through a sensor hub that includes virtual micro driver that accounts for field of view correction outside of the camera.

17. The non-transitory, computer-readable storage medium of claim 13 further comprising using control status from the image digital map for correction of proceeding images that are captured.

* * * * *